Sept. 1, 1959  J. FERRERA  2,902,312
EXPANSIBLE HOUSE TRAILER
Filed Sept. 14, 1953  4 Sheets-Sheet 1
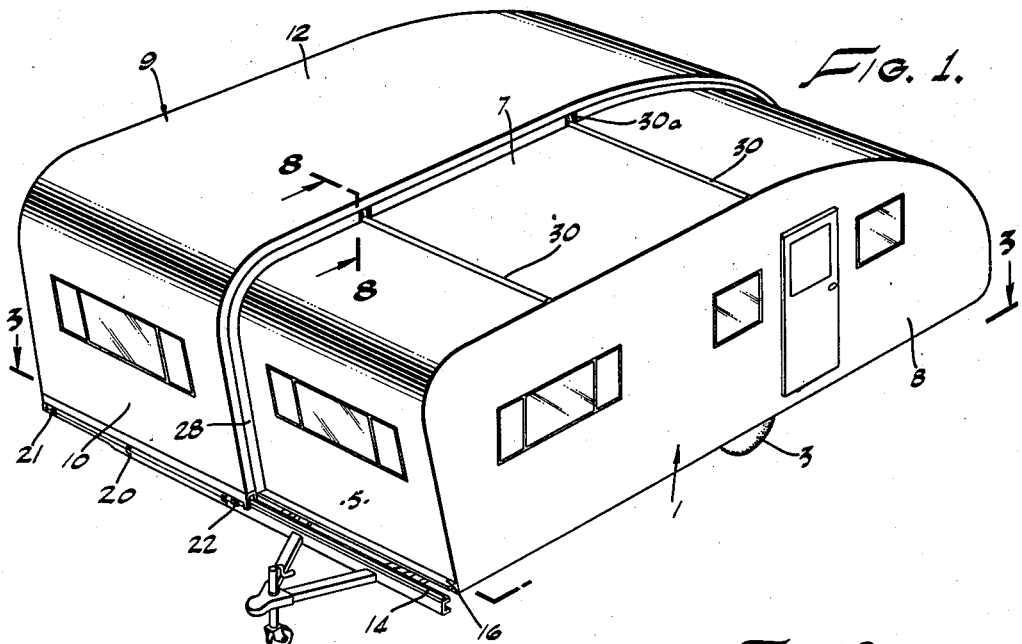
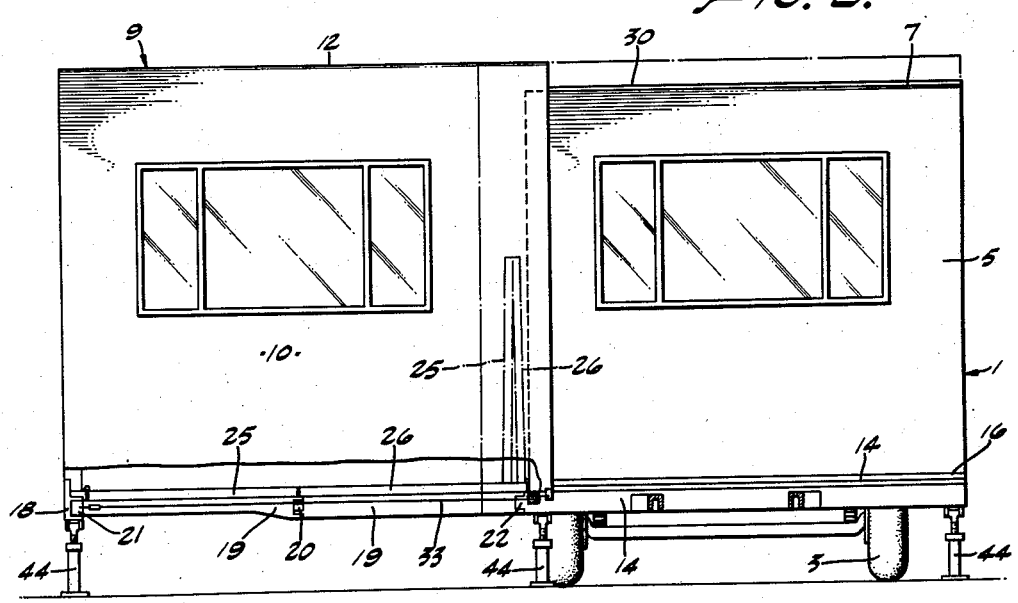
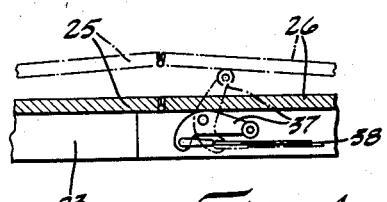
INVENTOR.
JOHN FERRERA
BY
ATTORNEYS

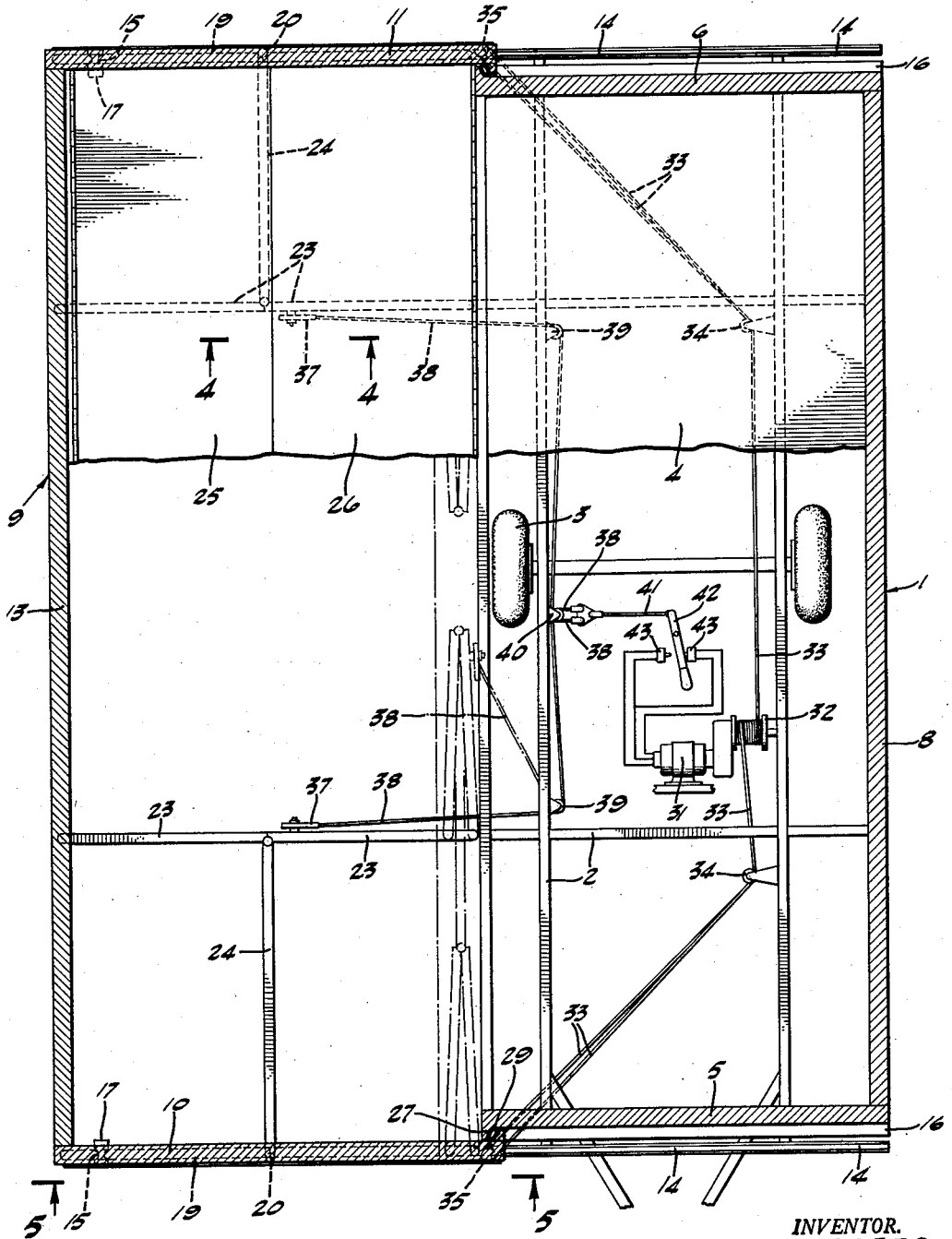

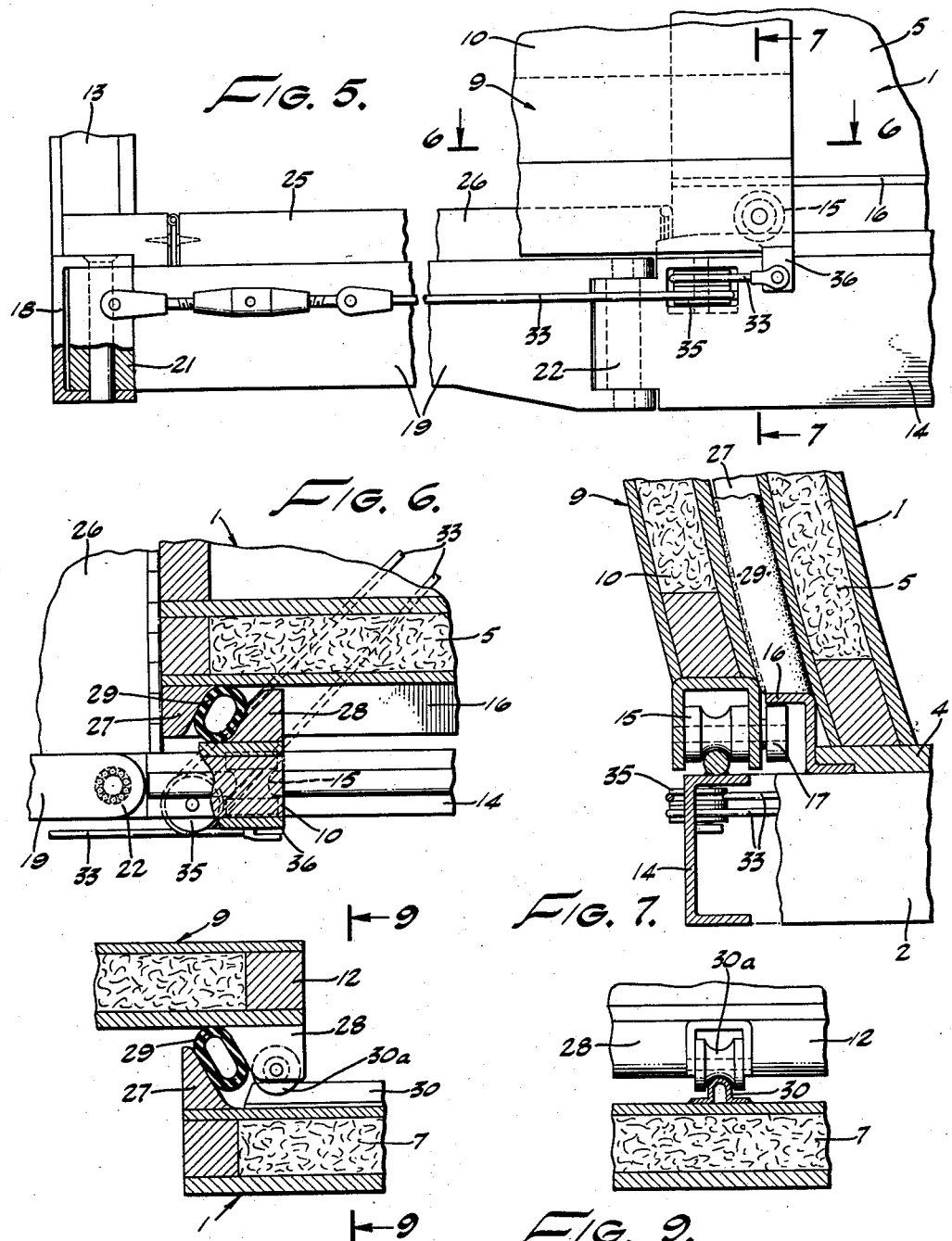

Sept. 1, 1959   J. FERRERA   2,902,312
EXPANSIBLE HOUSE TRAILER
Filed Sept. 14, 1953   4 Sheets-Sheet 4
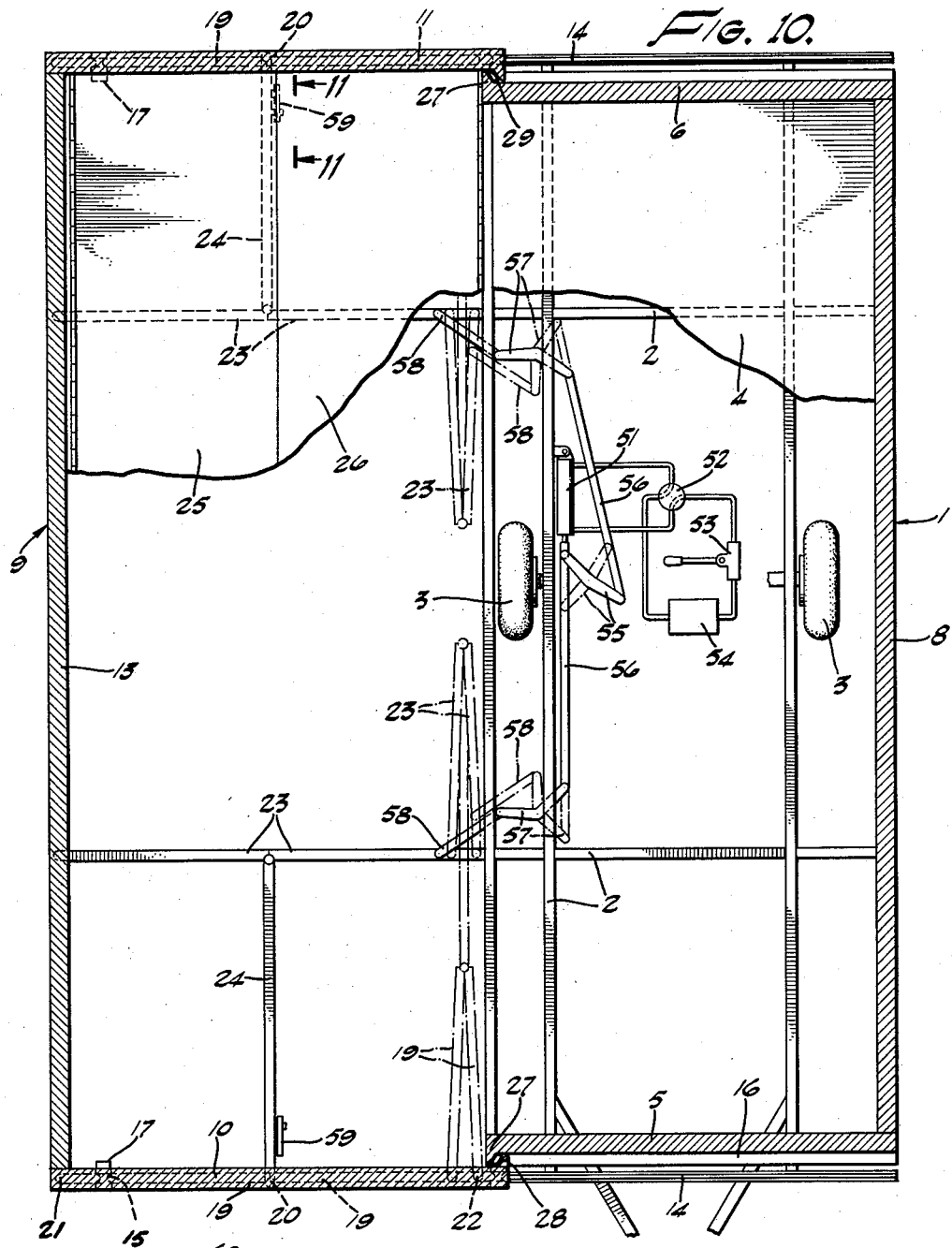
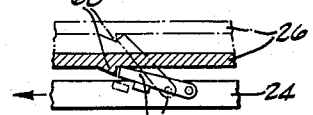
INVENTOR.
JOHN FERRERA
BY
ATTORNEYS

United States Patent Office 2,902,312
Patented Sept. 1, 1959

2,902,312

EXPANSIBLE HOUSE TRAILER

John Ferrera, Los Angeles, Calif.

Application September 14, 1953, Serial No. 379,932

13 Claims. (Cl. 296—23)

My invention relates to house trailers, more particularly to expansible house trailers, and included in the objects of my invention are:

First, to provide a house trailer which may be expanded laterally to substantially twice its collapsed size or retracted from its expanded condition with a minimum of effort and in a few minutes of time.

Second, to provide an expansible house trailer which employs a novel means for guiding the movable section of the trailer and a power-driven means for effecting such movement so that virtually no manual labor is required to expand or contract the trailer.

Third, to provide an expansible house trailer so arranged that the floor of the movable section automatically unfolds or folds into position as the trailer is expanded or contracted.

Fourth, to provide an expansible house trailer which may employ a novel motor, drum and cable means to effect expansion and contraction.

Fifth, to provide an expansible trailer which may employ a hydraulic or air cylinder operated link and lever means to effect expansion or contraction.

With the above and other objects in view as may appear hereinafter, reference is directed to the accompanying drawings in which:

Figure 1 is a perspective view of my expansible trailer shown in its extended or expanded position.

Figure 2 is a front view thereof showing the trailer in its expanded position.

Figure 3 is a substantially diagrammatic sectional view with portions of the trailer floor broken away and taken in the plane 3—3 of Figure 1.

Figure 4 is a fragmentary view taken through 4—4 of Figure 3 showing the manner in which the folding floor is elevated.

Figure 5 is an enlarged fragmentary view, partly in section and partly in elevation, taken substantially along the line 5—5 of Figure 3.

Figure 6 is a fragmentary sectional view taken through 6—6 of Figure 5 showing the connection between the fixed and expansible sections of the trailer.

Figure 7 is a fragmentary sectional view through 7—7 of Figure 5.

Figure 8 is a fragmentary sectional view through 8—8 of Figure 1 showing the connection betwen the roof portions of the fixed and expansible sections of the trailer.

Figure 9 is a fragmentary sectional view through 9—9 of Figure 8.

Figure 10 is a sectional view similar to Figure 3 showing a modified form of operating mechanism for effecting expansion and contraction of the trailer.

Figure 11 is a fragmentary sectional view through 11—11 of Figure 10 showing a means for effecting initial elevation of the folding floor.

Reference is first directed to the construction shown in Figures 1-9. In this construction my expansible trailer includes a fixed trailer section 1 mounted on a chassis 2 supported by a wheel unit 3. One end of the chassis protrudes and is provided with a conventional trailer hitch. The fixed trailer section is provided with a floor 4, a front wall 5, a rear wall 6, a roof 7 and one side wall 8. The proportions of the fixed trailer section are substantially the same as those of a conventional house trailer.

A movable trailer section 9, having a front wall 10, a rear wall 11, a roof 12 and a single side wall 13 is adapted to telescope over the fixed trailer section. The two sections, when telescoped, have the width equal to a conventional house trailer, but when the movable trailer section 9 is extended, the combined width of the two sections is approximately twice the width of a conventional house trailer.

To effect telescoping expansion and contraction of the trailer sections 1 and 9, the fixed trailer section is provided at the floor level forwardly of its front wall 5 and rearwardly of its rear wall 6 with track members 14.

The lower margin of the front wall 10 and rear wall 11 of the movable trailer section overlies the track members 14, and is provided with rollers 15 to ride thereon. Each track 14 comprises a channel member disposed on edge and provided with a rod welded along its upper flange. The rollers 15 may be grooved so as to be guided by such rod. Adjacent each track member the lower margins of the front and rear walls 5 and 6 of the fixed trailer section may be provided with retainer bars 16 forming rearwardly and forwardly directed channels in which ride retainer rollers 17 disposed coaxially with the rollers 16.

Along the lower margin of the side wall 13 of the movable trailer section 9 there is provided a beam 18. A pair of folding struts 19 connects the extremities of the beam 18 to the two track members 14. Each strut is made in two sections joined together by a hinge connection 20. The extremities of the struts are joined to the beam 18 and corresponding track member 14 by hinge connections 21 and 22, respectively.

Intermediate the ends of the movable trailer section 9 there may be provided two or more pairs of folding struts 23 provided with hinge connections similar to the hinge connections 20, 21 and 22. The hinge connections between the pairs of struts 19 and 23 are joined by connecting links 24. The struts are so arranged that their hinge connections 20 fold inwardly with respect to the ends of the trailer section.

Hinged along the floor 4 of the fixed trailer section and hinged along the lower margin of the side wall 13 of the movable trailer section above the beam 18 is a pair of floor sections 25 and 26. The floor sections are hinged together along their adjacent edges in approximate coincidence with the hinged connections 20 between the pairs of structs 19 and 23.

When the movable trailer section is extended as shown in Figure 3, the floor sections 25 and 26 are disposed horizontally. When the movable trailer section is telescoped over the fixed trailer section, the floor sections fold upwardly as indicated by broken lines in Figure 2.

The front wall 5, rear wall 6 and roof 7 of the fixed trailer section are provided at their margins framing the open side of the fixed trailer section with an outwardly directed flange 27. The corresponding margins of the front wall 10, rear wall 11 and roof 12 of the movable trailer section are provided with an internal flange 28. The flanges 27 and 28 overlap. Located adjacent the flange 27 is a yieldable seal tube 29 which is engaged by the flange 28 when the trailer sections are in their extended position, such as is shown in Figure 3.

In addition to the track members 14, the roof of the fixed trailer section may be provided with tracks 30 on which ride rollers 30a carried by the movable trailer section.

In the construction shown in Figures 1–9, expansion and contraction of the trailer is accomplished by a cable operating mechanism shown diagrammatically in Figure 3. The cable operating mechanism includes a motor 31 which drives a drum 32 around which is wrapped two pairs of cables 33 in such a manner that the members of each pair move in opposite directions. One pair of cables passes over a double sheave 34 under the floor of the fixed trailer and a second sheave 35 is located at the extremity of the forward track member 14 adjacent the corresponding folding strut 19. The two cable extremities extend in opposite directions from the sheave 35. One cable is attached to a bracket 36 depending from the lower corner of the front wall 10 adjacent the open side of the fixed trailer section and the other cable extends along the corresponding folding strut 19 and is attached to the extremity of the strut or to the beam 18. Similarly, the other pair of cables passes around the other sheaves 34 and 35, the latter located at the end of the fixed track member adjacent the rear wall 6 of the fixed trailer section.

When the drum 32 is wound in one direction the movable trailer section is drawn into telescoping relation with the fixed trailer cable section. When the drum is rotated in the opposite direction, the movable trailer section is caused to expand.

In order to accomplish this movement it is essential that the hinged floor sections be raised along their line of connection. This is accomplished by means of a lever 37 pivotally connected to the side of one of each pair of folding struts 23. Each floor elevating lever is operated by a cable 38 which extends over a sheave 39 located under the floor of the fixed trailer section. The two cables 38 pass over a double sheave 40 and are attached to a link 41 operated by a lever 42. The lever may be employed to operate a pair of switches 43 which controls the motor 31. The switches are spaced so as to enable the lever 42 to operate the floor elevating levers 37, as shown heat in Figure 4, before the motor is actuated.

Operation of my expansible trailer is as follows:

Assuming that the trailer is in its collapsed position, the hand lever 42 is operated to start the motor. In the collapsed condition of the trailer the floor elevating levers 37 have no function. The motor, on starting, rotates the drum 32 so as to play out the cables connected to the beam 18, or extended ends of the folding struts 19, and draw in on the cables attached to the brackets 36. This forces the movable trailer section 9 to move outwardly from the fixed trailer section. When the movable trailer section is in its extended position suitable jacks 44 may be placed under the corners of the movable trailer section.

Previous to expanding the trailer, other such jacks 44 are placed under the corners of the fixed trailer section. The jacks may be so arranged as to be attached permanently to the corners of the trailer sections.

Reference is now directed to the construction shown in Figures 10 and 11.

In this construction the trailer sections are identical to the structure previously described, but in place of the cable operating mechanism, to effect expansion and contraction of the trailer sections, a fluid drive mechanism is employed. The fluid drive mechanism employs a hydraulic or air cylinder 51 controlled by a four-way valve 52 so arranged that the fluid may be pumped into either end of the cylinder by a hand pump 53. Return fluid is collected in a reservoir 54. A motor driven pump may be substituted for the hand pump.

The cylinder 51 operates a lever 55, the opposite extremities of which are joined to connecting bars 56 which in turn are connected to levers 57 so positioned as to be connected by links 58 to the folding struts 23 at their ends adjacent the fixed trailer section 1. The link and lever arrangement is such that on contraction of the hydraulic or air cylinder 51 the movable trailer section is extended, whereas on expansion of the air cylinder the trailer sections are caused to telescope.

In order to effect initial raising of the floor sections 25 and 26, catch levers 59 are carried by the connecting links 24. The catch levers are so positioned as to engage lugs 60 extending downwardly from the floor sections so that initial contraction movement of the movable trailer section 9 causes the catch levers 59 to connect or push upwardly and start the hinged floor sections toward their folded position.

Having fully described my invention, it is to be understood that I do not wish to be limited to the details set forth, but my invention is of the full scope of the appended claims.

I claim:

1. An expansible trailer, comprising: a pair of telescoping trailer sections, each including a roof, three closed sides and an open side; horizontally foldable floor joists, each including a pair of arms and a hinge connection therebetween, said joists extending between and jointed to the open side of one of said trailer sections and the opposite closed side of the other trailer section; a vertically foldable floor unit including a pair of foldable sections and a hinge connection therebetween, one of said sections being permanently hinged to the open side of said one trailer section and the other of said foldable sections being permanently hinged to the opposite closed side of the other trailer section; said floor unit and said floor joists by reason of their connections with said trailer sections being adapted to extend and fold automatically with relative extension and retraction of said trailer sections; and means relatively extending and retracting said trailer sections.

2. An expansible trailer, comprising: a pair of telescoping trailer sections, each including a roof, three closed sides and open side; tracks on one of said trailer sections and cooperating rollers carried by the other of said trailer sections to guide said trailer sections between an extended and a retracted position; horizontally foldable floor joists, each including a pair of arms and a hinge connection therebetween, said joists extending between and joined to the open side of one of said trailer sections and the opposite closed side of the other trailer section; a vertically foldable floor unit including a pair of foldable sections and a hinge connection therebetween, one of said sections being permanently hinged to the open side of said one trailer section and the other of said foldable sections being permanently hinged to the opposite closed side of the other trailer section; said floor unit and said floor joists by reason of their connections with said trailer sections being adapted to extend and automatically with relative extension and retraction of said trailer sections; and means relatively extending and retracting said trailer sections.

3. An expansible trailer, comprising: a pair of telescoping trailer sections, each including a roof, three closed sides and an open side; overlapping flanges bordering the open sides of said trailer sections to limit expansion of said trailer sections; seal means interposed between said flanges; horizontally foldable floor joists, each including a pair of arms and a hinge connection therebetween, said joists extending between and joined to the open side of one of said trailer sections and the opposite closed side of the other trailer section; a vertically foldable floor unit including a pair of foldable sections and a hinge connection therebetween, one of said sections being permanently hinged to the open side of said one trailer section and the other of said foldable sections being permanently hinged to the opposite closed side of the other trailer section; said floor unit and said floor joists by reason of their connections with said trailer sections being adapted to extend and fold automatically with relative extension and retraction of said trailer sections; and means relatively extending and retracting said trailer sections.

4. An expansible trailer as set forth in claim 1, wherein: said means includes pairs of cables attached to the ends of one of the trailer sections; and means for playing out one cable of each pair and winding in the other.

5. An expansible trailer as set forth in claim 1, wherein: said means includes pairs of cables attached to the ends of one of the trailer sections; means for playing out one cable of each pair and winding in the other; and devices for initiating folding movement of said floor units prior to retracting said trailer sections.

6. An expansible trailer as set forth in claim 1, wherein: said means includes link and lever devices connected to said folding floor joists; and a power cylinder for effecting movement of said link and lever devices, whereby relative telescoping movement is imparted to said trailer sections through said folding floor joists.

7. An expansible trailer as set forth in claim 1, wherein: said means includes link and lever devices connected to said folding floor joists; a power cylinder for effecting movement of said link and lever devices, whereby relative telescoping movement is imparted to said trailer sections through said folding floor joists; and devices for initiating folding movement of said floor units prior to retracting said trailer sections.

8. A trailer construction, comprising: a pair of telescoping trailer units, one having a fixed floor, the other having a wall movable horizontally to and from the fixed floor; a vertically foldable floor hinged to said wall and said fixed floor and including at least two floor sections hinged together, whereby said floor sections fold between a vertical retracted position and a horizontal extended position; horizontally foldable floor joists, each hinged relative to said wall and fixed floor and hinged intermediate its ends for horizontal movement between an extended position and a retracted position; means for extending and telescoping said trailer units whereby said vertically foldable floor and horizontally foldable joists are simultaneously extended and retracted.

9. A trailer construction as set forth in claim 8, wherein: said extending and telescoping means is located under said floors and includes a pair of cables, each cable having ends connected below said foldable floor to each end of said trailer unit having said movable wall, pulleys for each cable disposed, to cause relative extension of said trailer units when one end of each cable is played out and the other drawn in, and to cause relative telescoping of said trailer units when said other ends of said cables are played out and said one ends are drawn in, and means for driving said cables.

10. A trailer construction as set forth in claim 8, wherein: said extending and telescoping means includes link and lever devices located under said floors and connected with said joists; and means for effecting movement or of said link and lever devices.

11. A trailer construction as set forth in claim 8, wherein: said extending and telescoping means is located wholly below said floors, and includes means disposed under said folding floor sections movable upwardly thereagainst to initiate folding of said floor sections and telescoping of said trailer units.

12. An expansible trailer, comprising: a fixed and a laterally movable trailer unit; tracks for guiding the laterally movable trailer unit to and from said fixed trailer unit between an extended and a retracted position; a series of horizontally foldable joists, each joists including a first section hinged about a vertical axis to said fixed trailer section, a second section hinged about a vertical axis to said laterally movable trailer and a hinge connection between said sections also having a vertical axis; a floor movable between an extended position overlying said joists and a retracted position; and means for relatively extending and retracting said trailer units.

13. A trailer construction, comprising: a first trailer section including floor, roof, end walls and a side wall, and open at its side opposite from said side wall; a chassis frame for supporting and transporting said first trailer section; a second trailer section having end walls and a roof adapted to fit over the end walls and roof of said first trailer section, an open side confronting the open side of the first trailer section, and an opposite closed side; track and roller means at the forward and rearward ends of said trailer sections to permit movement of said second trailer section between a telescoping retracted position and an extended position; a folding floor unit for said second trailer section, said floor unit being hinged to the floor of the first trailer section along the open side thereof, also hinged to the bottom margin of the closed side wall of said second trailer section and also hinged along its midportion; said folding floor unit being automatically foldable and extensible in response to retraction and extension of said trailer sections; said folding floor unit tending, when extended, to lock said trailer sections in their extended position; extensible and retractable joist structures connected to the bottom margin of the closed side wall and to said first trailer section and automatically movable to support said folding floor unit when said folding floor unit and trailer section are extended; operating means including link and lever devices extending between the trailer sections and a power cylinder for effecting movement of said link and lever devices to expand or retract said second trailer section, said operating means disposed wholly below the level of said floor and directly connecting said trailer sections to move said trailer sections relatively between said retracted and extended positions, and indirectly move said folding floor unit and expansible and retractable joist structures between these extended and retracted positions; and unlocking means for exerting a momentary upward force on said folding floor unit to move said folding floor unit from its extended and locking position, thereby to permit further folding of said folding floor unit in response to contraction of said trailer sections, said unlocking means including catch levers movable by said link and lever devices under the midportion of said floor unit, and catches on said folding floor to produce an upward thrust thereon when engaged by said catch levers.

References Cited in the file of this patent

UNITED STATES PATENTS

| | | |
|---|---|---|
| 1,721,198 | Athey | July 16, 1929 |
| 1,972,415 | Anderson | Sept. 4, 1934 |
| 2,147,892 | Gray | Feb. 21, 1939 |
| 2,368,936 | McGehee | Feb. 6, 1945 |
| 2,494,680 | Wiley | Jan. 17, 1950 |
| 2,636,773 | Van Tassel | Apr. 28, 1953 |

FOREIGN PATENTS

| | | |
|---|---|---|
| 822,783 | Germany | Nov. 29, 1951 |

(Corresponding to Canadian Patent 528,037, July 24, 1956)

| | | |
|---|---|---|
| 1,020,274 | France | Nov. 12, 1952 |